(12) United States Patent
Zhang et al.

(10) Patent No.: US 12,475,259 B2
(45) Date of Patent: Nov. 18, 2025

(54) PAIR-WISE GRAPH QUERYING, MERGING, AND COMPUTING FOR ACCOUNT LINKING

(71) Applicant: PAYPAL, INC., San Jose, CA (US)

(72) Inventors: Pengshan Zhang, Shanghai (CN); Alon Wiener, Tel Aviv (IL); Delin Liu, Shanghai (CN); Haoran Zhang, Shanghai (CN); Itzik Levi, Tel Aviv (IL); Junshi Guo, Shanghai (CN); Ying Lin, Shanghai (CN); Yu Zhang, Shanghai (CN); Zohar Li Marad, Holon (IL)

(73) Assignee: PAYPAL, INC., San Jose, CA (US)

( * ) Notice: Subject to any disclaimer, the term of this patent is extended or adjusted under 35 U.S.C. 154(b) by 566 days.

(21) Appl. No.: 17/942,969

(22) Filed: Sep. 12, 2022

(65) Prior Publication Data

US 2024/0086577 A1   Mar. 14, 2024

(51) Int. Cl.
*G06F 21/62* (2013.01)

(52) U.S. Cl.
CPC .................. *G06F 21/6263* (2013.01)

(58) Field of Classification Search
CPC .................................. G06F 21/6263
USPC ........................................ 726/27
See application file for complete search history.

(56) References Cited

U.S. PATENT DOCUMENTS

| | | | |
|---|---|---|---|
| 11,157,502 B1 * | 10/2021 | Chen | H04L 43/06 |
| 11,637,849 B1 * | 4/2023 | Chen | G06F 16/9537 |
| | | | 726/22 |
| 12,255,916 B2 * | 3/2025 | Costa | H04L 63/102 |
| 2020/0005195 A1 * | 1/2020 | Fang | G06N 20/20 |
| 2020/0026704 A1 * | 1/2020 | Kreutzer | G06F 16/24549 |
| 2020/0065814 A1 * | 2/2020 | Fang | G06Q 20/4014 |
| 2023/0351221 A1 * | 11/2023 | Chao | G06N 3/047 |
| 2024/0020340 A1 * | 1/2024 | Joshi | G06N 3/088 |
| 2024/0185284 A1 * | 6/2024 | Maas | G06Q 30/0631 |
| 2024/0305621 A1 * | 9/2024 | Nakatani | H04L 63/102 |

\* cited by examiner

*Primary Examiner* — Dereena T Cattungal
(74) *Attorney, Agent, or Firm* — Haynes and Boone, LLP

(57) ABSTRACT

There are provided systems and methods for pairwise graph querying, merging, and computing for account linking. A service provider may provide an account graph system to identify pairwise similarities between different accounts based on shared data that may be identified through one or more linking characteristics. When providing pairwise graph similarities, a service provider may receive a query identifying two or more accounts and/or an account with a parameter for graph exploration and querying. The service provider may utilize connection, link, or relationship graphs, queried and generated using a graph database, to determine pairwise similarities between the designated seed account and one or more selected accounts. The graph may include vertices for different queried data points and edges connecting such queries, where directionality of the edges or other vectors may be used to identify links or hops between accounts for data querying and exploration.

20 Claims, 5 Drawing Sheets

PAIR-WISE GRAPH QUERYING, MERGING, AND COMPUTING FOR ACCOUNT LINKING

TECHNICAL FIELD

The present application generally relates to graph databases and graph-based queries and more specifically to pairwise traversing and merging of account data for two or more account graphs.

BACKGROUND

Service provider systems may provide services to customer entities, such as businesses and companies, through computing systems and networks. These services may include computing services for transaction processors that provide digital accounts, including those associated with electronic transaction processing, online digital platforms, and other account services. Conventionally, electronic transaction processors may have difficulty and spend significant computing resources to identify and prevent account take over (ATO) fraud and other risk or fraud trends in real-time, near real-time, and/or after a short time after the fraud trend occurs. Conventional fraud detection systems may take a significant amount of time to identify that a fraud trend is occurring based on account and/or transaction data. When a fraud trend occurs, the electronic transaction processors may be required to identify the trend, determine solutions to the trend, and prevent further abuse. This may lead to more loss and fraud occurring, which causes loss and further damages the service provider's brand recognition. As such, operations for more accurately and quickly identifying fraudulent account activity are desired. Therefore, there is a need to address deficiencies with conventional computing systems used by online transaction processors and other services providers with identifying ATO and other fraud in a fast and efficient manner. In addition to fraud detection and remediation, service providers may desire to provide additional computing operations and services to accounts that share or are connected through other accounts, characteristics, and the like.

Figure 1:
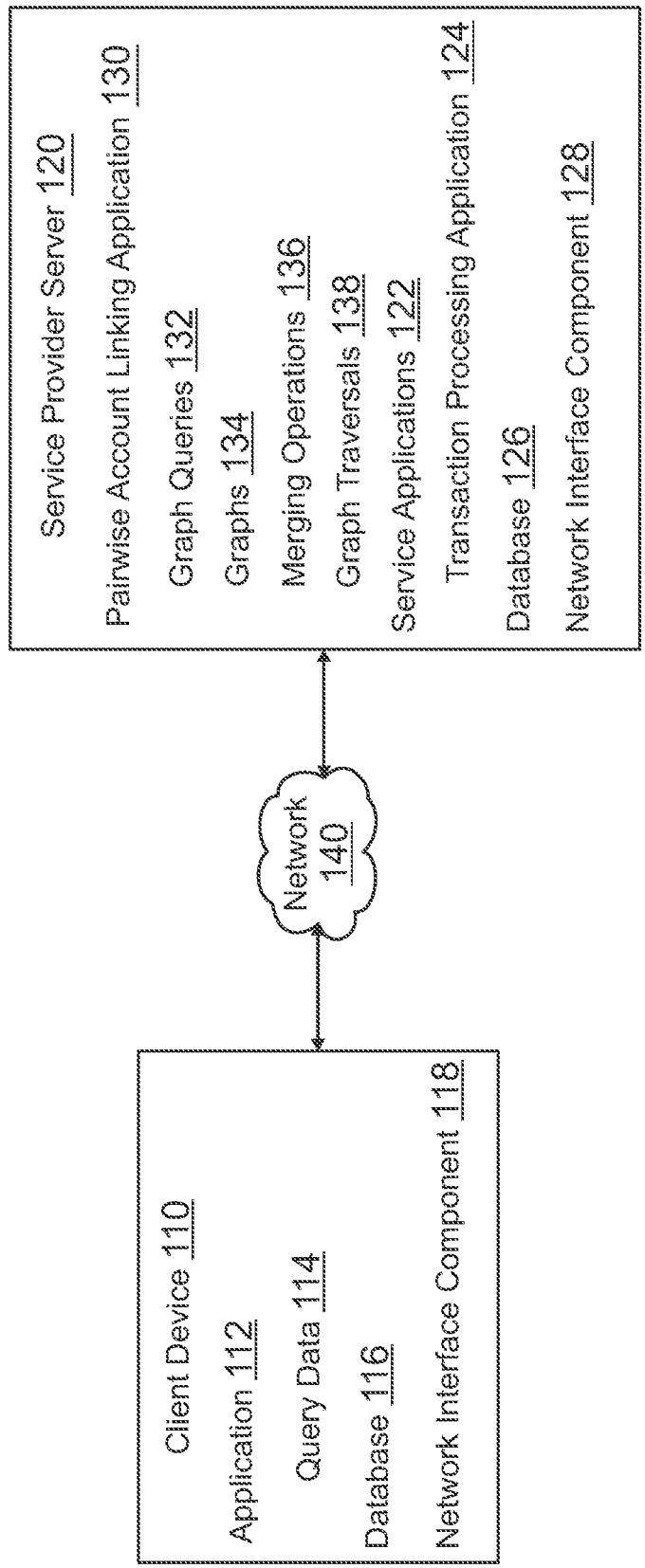
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for pairwise graph querying, merging, and computing for account linking that improves identification of fraud trends and provides enhanced services. Systems suitable for practicing methods of the present disclosure are also provided.

In order to reduce fraud and/or provide improved services during electronic processing such as payment promotion recommendations, compliance case explorations, and risk collusion use cases, a graph-wise traversal and linkage system may be utilized based on graph database queries and graph-based data models. Service providers may benefit from linking and identifying accounts or other data points that are related and/or connected by communications, transactions, or other interactions. The service providers may utilize graph-based databases and queries in order to compute pairwise sender and receiver linking behavior and explore the relationship between different accounts and/or datapoints. For example, by computing pairwise similarity, it may be determined where there is any collusion riskiness, if their similarity may lead to promotions of similar data, benefits, or behaviors (e.g., if the account linkage can be promoted for the same payment promotion event), and/or where there are compliance issues.

Thus, by linking accounts, same or similar services may be provided to similar or linked users. For example, in addition to risk collusion and fraud detection, service promotion may be provided where linked accounts, through one or more steps, may be interested in each other for interaction, as well as for the same or similar products and services. These steps may correspond to shared account interactions or links, shared data usage and/or communications, same or similar device or network activity or data, and the like. Additionally, compliance exploration and servicing may be provided by linking accounts, such as by identifying potential money laundering schemes and/or opportunities between accounts that may use intermediary accounts to facilitate such fraud. A number of steps or links during traversal between two different accounts may identify the similarity of such accounts and/or whether such accounts are linked and engaging in similar behavior that warrants use of such services.

For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a username, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. Accounts may also be linked and/or used by devices and/or over networks, which may cause device and network data to be linked to accounts.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. However, malicious users, entities, and/or other computing devices (e.g., computing devices that may include malware, viruses, and the like) may attempt to abuse the computing services and/or digital accounts in order to compromise sensitive data, engage in fraudulent behavior and electronic transaction processing, perform money laundering or other illegal activity, or the like. In further embodiments, accounts may be used legitimately, but may not receive proper account information, engagement, or the like.

Identification of similar or like accounts can be used to improve fraud detection, as well as provide improved services, such as recommendations and content. In order to identify pairwise (or account) similarity, the service provider's computational systems may trigger a sender and receiver (or other seed data) compute logic at the same time for each account or other data point. One or more queries may be used to identify and build a sender and receiver linking relationship not only by direct linking such accounts or other data points but also by multiple hops of transactions, communications, or other interactions linking the accounts to identify the two or more account's potential advanced linking relationship. This may be provided though a flexible compute logic support system that may generate a sender and receiver merged subgraph from the graph-based data queries and constructed graphs (e.g., nodes for interactions connected by edges based on queried data and corresponding processing logic). Online compute support may ensure an average latency requirement in order to provide fast data processing.

For example, users, accounts, devices, and/or other data may be associated with universally unique identifiers (UUIDs) or other identifiers in order to identify that data in computing systems and communicated over networks. This eliminates the need to utilize personally identifiable information (PII) that may be sensitive or at risk of misuse or misappropriation. The identifiers may serve as a primary lookup key in a database that allows for identification, querying, and resolution of requests for data. In this regard, virtual or data graphs may include relationship graphs or social graphs that may be graphs in two or three-dimensional space representing links, connections, shared data, relationships, and the like between different graph objects. Graph objects may include nodes that have a corresponding object and/or resource designated by a graph-based query to a graph database system and query model. The connections of an object to different objects may show links, connections, relationships, and the like between objects.

For example, a user may be linked to a financial instrument, transaction, device identifier or data, network identifier, activity or action, or the like. These may be shown through linear relationships between objects, where objects may be linked and represented in the graph. In some embodiments, graphs may be directed where edges (e.g., the lines showing an ordered pair of nodes) may indicate certain directions of activities and other relationships between different nodes. For example, edges may have vectors in certain directions that identify a particular activity or relationship, such as money sent to a party, a sender or receiver of funds during a transaction, a customer and a merchant, a sender or receiver of a communication, or the like. These pathways, edges, objects, vertices, and/or nodes may correspond to the graph that identifies activities of an account with one or more other accounts, users, or the like.

A graph database may serve as a database resource allowing for querying, generating, and returning of graphs for accounts and one or more queried parameters associated with the accounts. The graph database may include APIs that allow for API calls to be exchanged with a transaction processor's or service provider's computing system in order to persist policies and query the database. The graph database may be specifically selected and implemented to allow for a query language for graph queries. The graph database and query APIs may be specific to graph queries and the query language of the graph database. The graph database may further allow a visualization of a graph when queried and returned so that end users and/or entities may visualize the graph. In this regard, APIs for the graph database may be used to interface with the graph database and obtain a graph that allows for evaluation of graphs of users and pairwise graph merging and comparison for graph traversals and data exploration.

A query may be generated for an account and a graph may be returned with two or more nodes having one or more connections. Vertices in the graph may correspond to a base account, object, or other data. Once queried, the graph may be returned, which may be parsed and analyzed to determine connections between vertices based on edges of the relationship graph. A graph traversal may be used to return paths from a starting node or vertex for an account or other data to a target node or vertex. Further, the graph traversal may be used to query and/or explore data for an account. However, when two or more graphs are merged, traversals may be used to explore relationships, interactions, or the like between those accounts as the same or similar shared nodes or vertices are coordinated and merged for the pairwise similarity. Once the graph traversal in completed, a response may be provided based on the query or exploration parameter.

Thus, there may be built a pairwise (or other multiple seeds) graph query compute capability having a traversal operation for a "traversal to merge to compute" (TMC) framework. In this regard, the TMC framework may have a first step to run graph traversal queries from multiple seeds, such as sender and receiver accounts, with a 2 or more-hop transaction linking query. For example, a first query for an account may correspond to: a sender transaction→account transaction→another account. A second query for another account may correspond to: receiver transaction→account transaction→another account. Thereafter, a next step may be processed to merge those two query results into the same graph that links the transactions and accounts. For example, sender transaction→account transaction→other account←account transaction←receiver transaction, whereby the sender and receiver accounts are linked through this second step having the transactions with an account or other linking data between the accounts. A third step may be executed where, based on the merged subgraph, there is computed one or more paths between the sender and receiver accounts, whether that path occurs, how many restricted accounts between cross sender-receiver linked paths are found, how many connections or links occur, and the like. Thereafter, based on machine learning (ML) and/or rules-based engines may be used to make intelligent decisions about risk collusion, payment promotion, compliance exploration, and the like. As a computation and pairwise graph merging framework, this may allow for customization of the pairwise similarity and graph traversals for linking accounts based on needs and queries.

Seed labels and/or definitions may include an account, account identifier, account or user information, IP address, card identifier, transaction label or identifier, or any vertex label for an available graph instance. Traversal definitions may include 1-hop, 2-hops, or X-hops through the graph when traversed by transaction, card, or another label or interaction. Thereafter, the compute capability may be provided by a user defined function (UDF), including like path( ), count(filter), sum(filter), and/or user/queries may define their own UDFs if existing UDFs are not sufficient and/or available for querying and/or graph traversal for identifying similarities between accounts based on merged graphs and pairwise graph similarities. In some embodiments, defining or creating UDFs may be done automatically and/or by an automated computing system using a rules-based or ML-based engine or system, which may define UDFs based on seed labels, definitions, and/or queries for graph traversals. Conventional graph-based queries do not provide for pairwise (or multiple seeds) based graph traversals, merge, and compute capabilities. Thus, there may be provided a pairwise graph compute platform designed to allow for a user and/or query to define seeds (sender, receiver, IP, card, etc.), hops (1-hop, 2-hops, 3-hops, etc.), and merge compute logic for graphs generated from graph queries. The user may therefore provide a query, seed labels, hops, and/or account definitions, where the graph compute platform may automatically merge two or more account graphs in order to allow for graph exploration and/or query responses without requiring a user to perform traversals over the merged graphs to identify linked accounts and/or characteristics.

When utilizing pairwise graph merging and compute capabilities for compliance use cases, from sender and receiver seed accounts, their linking paths may be determined in multiple hops based on the graph linking capability. For risk collusion use cases (sender and receiver are both fraudulent users or entities), for a user-to-user transactions, from sender there may be a traversal, such as 2-hops, to identify the fraudulent receiver account. For example, for 2-hops, there may be sender→account→account by transaction linking, then from receiver traversal there may be receiver→account→account. Those may then be merged as two subgraphs into their corresponding 2-hops, such as: sender→account→account←account←receiver. Thereafter, there may be computed a number of linked paths between sender and receiver and the ratio of linked paths may be used to identify the potential collusion of sender-receiver accounts. For risk consumer linking use cases, per each user-to-user transaction, there may be a need to find a linking credit card, bank account number between sender and receiver, or the like. This may be done using the operations for pairwise graph linking and similarity. For example, a link may be as follows: sender→card (or bank), receiver→card (or bank). Thereafter, those two may be merged to result in: sender→card (or bank)←receiver. The online transaction processor may then compute a number of the same card linked by both sender and receiver to determine risk and/or compliance.

For payment promotion recommendation use cases, first the online transaction processor may identify recent user-to-user transactions, interactions, or other promotion events. For example, if the sender clicked or applied one promotion event, this event may be identified for graph-based querying, traversal, and linking. Thereafter, it may be checked from receiver by 1-hop or 2-hops, such as receiver→account→account, and if there are paths merged by the same sender→account→account as receiver(s), such promotion events may also be sent to the receiver account(s) separated by 2-hops as there may be a high potential for those accounts to join or be interested in those promotion events.

Using the pairwise graph merge and compute operations discussed herein, two or more-way graph queries and parallel merging and compute capabilities may be provided, which may optimize the overall latency of computing systems for identifying similarities for lower responses times (e.g., less millisecond processing, such as a 10-millisecond response time). In contrast, conventional solutions may finish the same process in 100 milliseconds or more that overly consumes processing resources, is lengthier, and less efficient. This may be built as features for ML models and/or other rules or artificial intelligence (AI)-based engines. Thus, a pairwise graph linking traversal, merge, and compute operation may enable recommendation, risk, and compliance linking operations, such as to identify the same linked account, card, bank account or financial information, and the like between senders and receivers based on pairwise graph computes.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client device 110 and a service provider server 120 in communication over a network 140. A user (not shown) may utilize client device 110 to communicate with service provider server 120 over network 140. Service provider server 120 may provide various data, operations, and other functions over network 140 for available computing services to users and devices. In this regard, client device 110 may be used to interact with service provider server 120 in order to query and explore pairwise similarities between accounts based on merged graphs from graph-based databases.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and displaying interfaces that may allow for graph-based queries and pairwise graph querying based on merged data graphs from graph databases. In this regard, application 112 may correspond to specialized software utilized by a user of client device 110 that may be used to access a website or application (e.g., mobile application, rich Internet application, or resident software application) that may display one or more user interfaces that allow for interaction with service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity. Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like.

When using application 112, one or more user interfaces may allow a user to perform activities with service provider server 120. In various embodiments, application 112 may be utilized to provide a query having query data 114 to service provider server 120 for determination of a pairwise graph similarity between accounts and/or resolution of a relationship between those accounts based on the pairwise similarity. Query data 114 may include identification of an account, such as a user that has an account, UUID, and/or other identifying data in a computing system of service provider server 120 and/or an entity corresponding to client device 110. Query data 114 may further include a parameter for identification of the similarity or similarities between those accounts, as well as how many hops, nodes, vertices, or edges should connect those accounts. Query data 114 may be provided to service provider server 120 for processing using a graph from a graph database system, database, and/or server. The query may be in or may be converted to a query language, such as AQL, SQL or another query language, used by a graph database server. The relationship graph may be used to provide a result, such as one or more graphs, pairwise graph similarities and merged graphs, query results for those merged graphs, and/or other graph explorations.

Client device 110 may further include a database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or other applications, identifiers associated with hardware of client device 110, or other appropriate identifiers, such as identifiers used for payment/user/device authentication or identification, which may be communicated as identifying the user/client device 110 to service provider server 120. Moreover, database 116 may store information for one or more graph-based queries, including those used for pairwise graph similarities.

Client device 110 includes at least one network interface component 118 adapted to communicate with service provider server 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide computing services that provides accounts, electronic transaction processing, and/or other digital computing services to users. In this regard, service provider server 120 includes one or more processing applications which may be configured to interact with client device 110. For example, service provider server 120 may deploy decision services that include intelligent execution managers in order to determine whether to re-run failed execution tasks during an execution flow of the decision service. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes pairwise account linking application 130, service applications 122, a database 126, and a network interface component 128. Pairwise account linking application 130 and service applications 122 may correspond to executable processes, procedures, and/or applications with associated hardware. In other embodiments, service provider server 120 may include additional or different modules having specialized hardware and/or software as required.

Pairwise account linking application 130 may correspond to one or more processes to execute modules and associated specialized hardware of service provider server 120 that are associated with computing services for account usage, digital electronic communications, electronic transaction processing, and the like. In this regard, pairwise account linking application 130 may correspond to specialized hardware and/or software used by a user associated with client device 110 that integrate with one or more computing services available through service applications 122 that may provide services for pairwise account linking and data querying/exploration based on merged graphs. Such computing operations may be linked with and/or provided through service applications 122.

For example, service applications 122 may include transaction processing application 122 corresponding to electronic transaction processing, payment accounts, payment messaging, and the like. Further, service applications may include social networking, media posting or sharing, microblogging, data browsing and searching, online shopping, and other services available through service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for access and use of the computing services of pairwise account linking application 130.

The computing services may be accessed and/or used through a browser application and/or dedicated payment application executed by client device 110, such as application 112 that displays UIs from service provider server 120 for pairwise account linking application 130 and/or service applications 122. Such account services, account setup, authentication, electronic transaction processing, and other computing services of service applications 122 for service applications 122 and/or pairwise account linking application 130 may utilize authentication, electronic transaction processing, risk analysis, fraud detection, and the other decision-making and data processing required by the aforementioned computing services by service applications 122 based on one or more account graphs that may be merged to determine pairwise graph similarities, connections, and/or links.

Pairwise account linking application 130 may allow service providers and users to query a database to return graphs to graph queries. In some embodiments, pairwise account linking application 130 may utilize a graph query language and database, such as AQL for ArangoDB™ for graph-based querying and return of graphs for accounts. In this regard, pairwise account linking application 130 may receive one or more of graph queries 132 from client device 110 and/or service provider server 120 for a query to determine connections, links, and other relationships between different accounts, account data objects, and other data based on a graph database and graph query language. Pairwise account linking application 130 may utilize APIs exposed to service provider server 120 for integrations and query submission and processing using graph-based query languages and database.

Graph queries 132 may correspond to queries that may return graphs 134 having graph nodes, objects, and connections for accounts that may then be merged using merging operations 136 for pairwise graph similarity processing and exploration. This processing, querying, and/or exploration for relationships between accounts may be based on graph traversals 138. In other embodiments, graphs 134 may not need to fully be returned to service provider server 120, such as if the query from graph queries 132 instead identifies a particular portion of a graph and/or subset of a graph. In various embodiments, graphs 134 may include nodes and edges connecting nodes that have a corresponding vectorization to show relationships and connections between different data points and/or data interactions. Service provider server 120 may then use graphs 134 for determining pairwise account similarities when merging different graphs for accounts.

Pairwise account linking application 130 may utilize the query to determine graphs 134. Pairwise account linking application 130 may utilize a graph database that may be queried to return a relationship graph that is used to determine links between different account data points. In this regard, the query may be converted to, constructed in, and/or generated in a query language for pairwise account linking application 130, such as AQL for ArangoDB™ databases and systems. Other database systems may include Neo4J, OrientDB, PostGRES recursive Common Table Expressions (CTE), or other graph databases. The graph database and/or pairwise account linking application 130 may be internal to service provider server 120 or an external server and/or database in communication with service provider server 120 over network 140. Pairwise account linking application 130 may return graphs 134 for multiple accounts. Then for two or more accounts, merging operations 136 may be executed to merge graphs of those accounts based on shared, same, or similar data points. This may then be used for graph traversals 138 that examine a number and shared links and steps or "hops" through those links and connections, between different accounts. For example, a single hop in a graph traversal may mean that two accounts share the same data point, such as an interaction with a same account. Two hops may mean there is a two step removal or disparity between such accounts. Graph traversals 138 may then be used during risk compliance, fraud, promotions, and the like.

Graph traversals 138 may be used to query and/or explore merged graphs for pairwise similarities between accounts based on a queried parameter. For example, graph traversals 138 may utilize rules and/or a rule-based engine for merging graphs and/or querying and exploring merged graphs for pairwise account similarities. In further embodiments, pairwise account linking application 130 may include AI models, such as machine learning (ML) or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for pairwise account linking application 130, training data may be used to generate one or more classifiers and provide recommendations, predictions, or other outputs based on those classifications and an ML model. The training data may be used to determine input features for training predictive scores for querying and/or graph exploration. For example, ML models for pairwise account linking application 130 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for pairwise account linking application 130.

Thereafter, the hidden layer(s) may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for pairwise account linking application 130 that attempt to classify or predict a corresponding response to a query or graph exploration request. Thus, when ML models for pairwise account linking application 130 are used to perform a predictive analysis and output, the input may provide a corresponding output based on the classifications trained for ML models for pairwise account linking application 130.

ML models for pairwise account linking application 130 may be trained by using training data, as well as the aforementioned features for graph traversals 138, corresponding computing tasks, metadata, and/or the like. By providing training data to train ML models for pairwise account linking application 130, the nodes in the hidden layer may be trained (adjusted) such that an optimal output (e.g., a classification) is produced in the output layer based on the training data. By continuously providing different sets of training data and penalizing ML models for pairwise account linking application 130 when the output of ML models for pairwise account linking application 130 is incorrect, ML models for pairwise account linking application 130 (and specifically, the representations of the nodes in the hidden layer) may be trained (adjusted) to improve its performance in data classification and predictions. Adjusting ML models for pairwise account linking application 130 may include adjusting the weights associated with each node in the hidden layer. Thus, the training data may be used as input/output data sets that allow for ML models for pairwise account linking application 130 to make classifications based on input attributes. The output classifications for an ML model trained for pairwise account linking application 130 may be classifications of likelihood and/or predictions based on the input data and features.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to providing computing services to users, which may include electronic transaction processing and/or other computing services using accounts provided by service provider server 120. In some embodiments, service applications 122 may be used by users associated with client device 110 and/or other devices to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 120. The digital accounts may be accessed and/or used through one or more instances of a web browser application and/or dedicated software application executed by client device 110 and/or other devices or components, which may engage in computing services provided by service applications 122. Computing services of service applications 122 may also or instead correspond to messaging, social networking, media posting or sharing, microblogging, data browsing and searching, online shopping, and other services available through service provider server 120.

In various embodiments, service applications 122 may be desired in particular embodiments to provide features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including a graphical user interface (GUI), configured to provide an interface to a user when accessing service provider server 120 via one or more of client device 110 or another device, server, or component, where the user or other users may interact with the GUI to view and communicate information more easily. In various embodiments, service applications 122 may include additional connection and/or communication applications, which may be utilized to communicate information to over network 140.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store graph data and/or graphs of nodes (e.g., as vertices) connected by edges to generate pathways and/or other flows that identify relationships and/or connections between different nodes. Database 126 may, in some embodiments, correspond to and/or include a graph database that may be responsive to graph-based queries to return graphs that may be merged to determine pairwise graph similarities between accounts or other data points.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2:
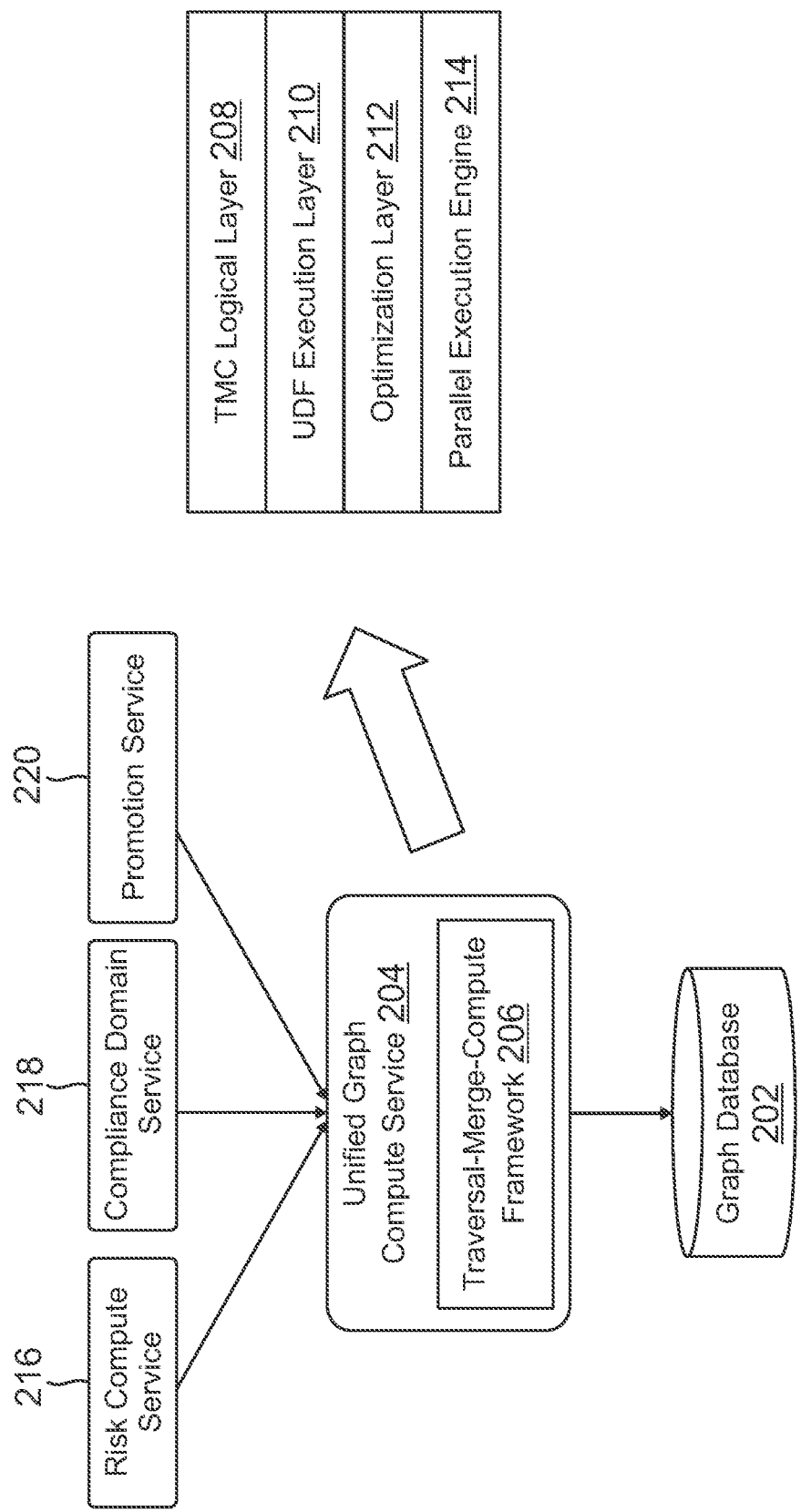
FIG. 2 is an exemplary system architecture for a pairwise graph computing environment to provide account linking and data querying and exploration between different accounts, according to an embodiment.

FIG. 2 is an exemplary system architecture 200 for a pairwise graph computing environment to provide account linking and data querying and exploration between different accounts, according to an embodiment. System architecture 200 includes a graph database 202 that may be requested by a system for pairwise graph merging and querying, where graph database 202 may be utilized by client device 110 and/or service provider server 120 discussed in reference to system 100 of FIG. 1 when providing computing resources to users. In this regard, graph database 202 may receive a query in a graph-based query language and/or format that allows for returning of one or more account-based relationship graphs to other data for merging, querying, and exploration of data retrievals.

In this regard, a query may be received by a unified graph compute service 204, which may include a traversal-merge-compute (TMC) framework 206. TMC framework 206 may correspond to an online platform and computing system that may be accessed by computing devices of users over a network in order to query for pairwise account similarities using merged account graphs. For example, the query may correspond to a request to identify an interaction, communication, link, or other data query between two or more accounts. The query may identify a sender account, a receiver account, and a parameter that may link accounts, the query may further include a number of hops or steps between data linkages of those accounts when graphs of those accounts are merged. TMC framework 206 may include a computing system that may request data and/or provide graph-based queries to graph database 202 based on the received query from a user and return two or more account graphs for the identified accounts and query parameters. TMC framework 206 may then merge such graphs based on the same or similar shared account interactions, characteristics, parameters, or other data.

TMC framework 206 may include different computing layers, which may be used in order to provide services for graph database querying, traversal, exploration, and data processing. For example, TMC framework 206 may include TMC logical layer 208, a user defined functions (UDF) execution layer 210, an optimization layer 212, and a parallel execution layer 214. Each of these layers may correspond to different computing and data processing layers utilized by TMC framework 206, which may allow for receipt and processing of queries, determination of graphs associated with accounts or other data points, merging of such graphs between two or more accounts or the like, and traversal or exploration of such merged graphs in order to respond to a data query for similarities between accounts.

The query may be received based on different computing services that interact with unified graph compute service 204. For example, an online transaction processor or other service provider may provide a risk compute service 216, a compliance domain service 218, and/or a promotion service 220. Each of these may correspond to domains, computing services, applications, and the like that may allow for identifying and/or merging of graphs between two or more accounts (or other selected data structures/points) in order to resolve queries, data exploration requests, graph traversals, and the like. Such services provided by risk compute service 216, compliance domain service 218, and promotion service 220 may be internal to a computing system and framework of an online transaction processor or other service provider, or may be external facing and available to other users, client computing devices, and the like.

Figure 3:
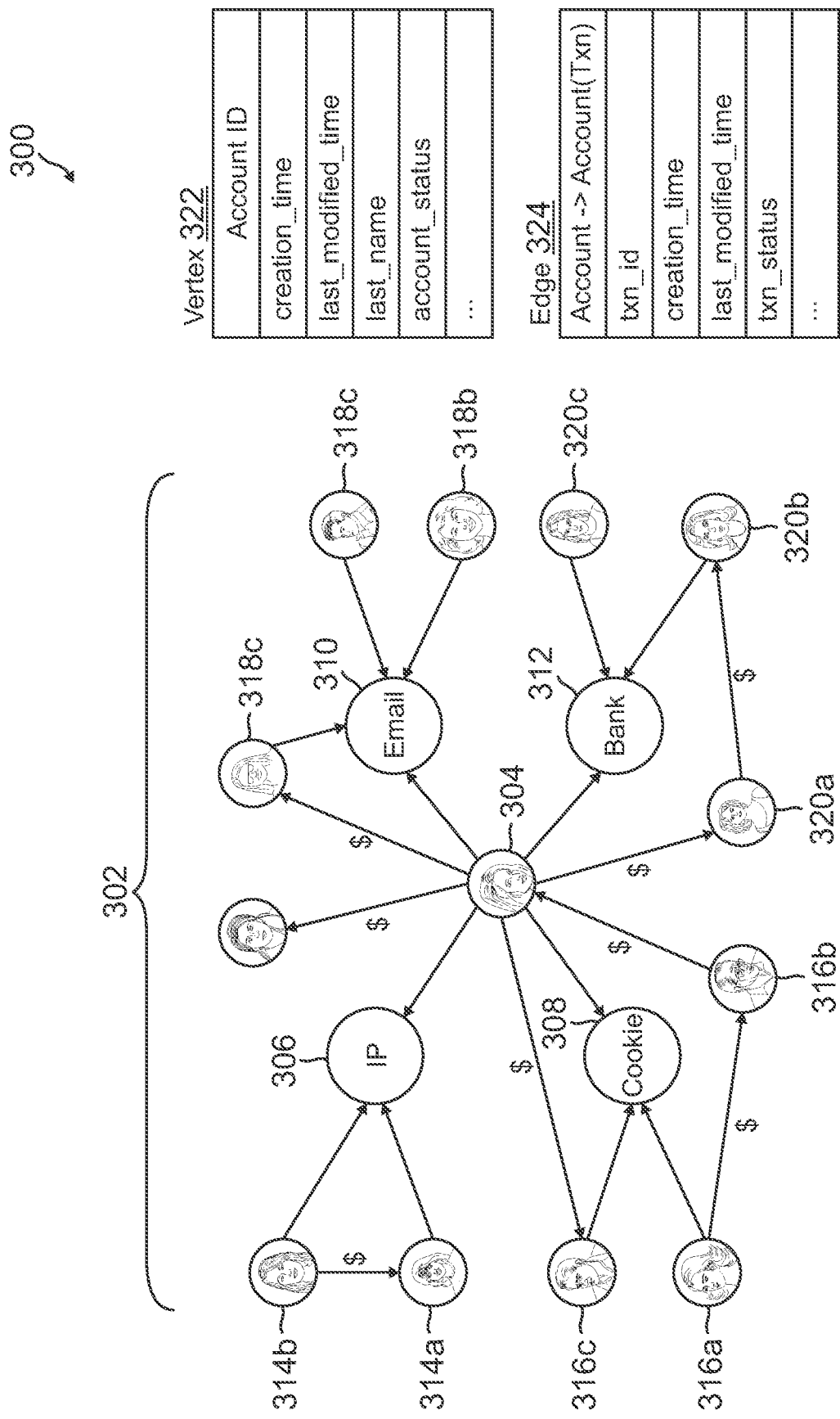
FIG. 3 is an exemplary diagram of account relationships graphs between a seed account and multiple identified accounts using pairwise graph merging and similarities, according to an embodiment.

FIG. 3 is an exemplary diagram 300 of account relationships graphs between a seed account and multiple identified accounts using pairwise graph merging and similarities, according to an embodiment. Diagram 300 includes representations of connections, links, and/or relationships in a graph form that may be used by service provider server 120 using pairwise account linking application 130 discussed in reference to system 100 of FIG. 1. In this regard, diagram 300 may be provided and processed through API endpoints with a graph database that may be internal and/or external to service provider server 120.

Diagram 300 includes a relationship or social graph 302 that connects nodes to form edges that designate connections between the corresponding accounts that have had merged account graphs using a graph merge and compute framework. In this regard, a user or system may be designated to determine the corresponding accounts that are to be merged using graph queries and resulting graphs, such as graph 302 shown in diagram 300.

A query may be received to determine relationships that a seed account 304 may have one or more secondary accounts identified for graph merging and pairwise similarity exploration. The query may request an answer in the form of a table shown in diagram 300. A graph database may return graph 302 in order to identify connections, via one or more links, to other accounts and data in order to provide quick and efficient responses to account linking similarities.

Thereafter, one or more computing operations and processors may parse graph 302 in order to return a response to a query or request for graph exploration. For example, graph 302 may be generated out of a query for account 304 based on one or more of parameters 306, 308, 310, and/or 312. Each data portion, identifier, metadata, or the like of parameters 306-312 may correspond to data associated with account 304 in graph 302. For example, parameter 306 may correspond to an IP address that may be shared or co-located with one or more other IP addresses for accounts 314*a-c*. Parameter 308 may correspond to a web cookie or other persistent or semi-persistent data that is used to uniquely identify a device and/or session, which may be linked to accounts 316*a-c*. Parameter 310 may correspond to an email or email address, where corresponding electronic communications link account 304 to accounts 318*a-c*. Further, parameter 312 may correspond to a bank account or other financial instrument or data that links account 304 to accounts 302*a-c*.

Each of the nodes and/or vertices for account 304 and/or parameters 306, 308, 310, and 312 may be defined by vertex data 322, and connections between such nodes and/or vertices may be designated by edges 324. When parsing graph 302 in diagram 300 for links of account 304 to other accounts, such as when performing a graph traversal to determine a relationship of account 304 to one or more of accounts 314*a*, 316*b*, 318*b*, 318*c*, and/or 320*a-c*, which may appear legitimate and/or are known to be linked to account 304, one or more of accounts 314*b*, 316*b*, 316*c*, 318*c*, or the like may be returned. These may correspond to graph traversals and/or explorations that allow linking of account 304 to accounts 314*a-c*, accounts 316*a-c*, accounts 318*a-c*, and/or accounts 320*a-c* based on parameters 306, 308, 310, and 312, respectively. Graph traversals may be performed in response to merging the graph of account 304 with one or more of account 304 to accounts 314*a-c*, accounts 316*a-c*, accounts 318*a-c*, and/or accounts 320*a-c* after a graph-based database query. Thus, data for risk, compliance, promotions, and the like may be more quickly and efficiently identified and processed using such pairwise graph merging and similarities.

Figure 4:
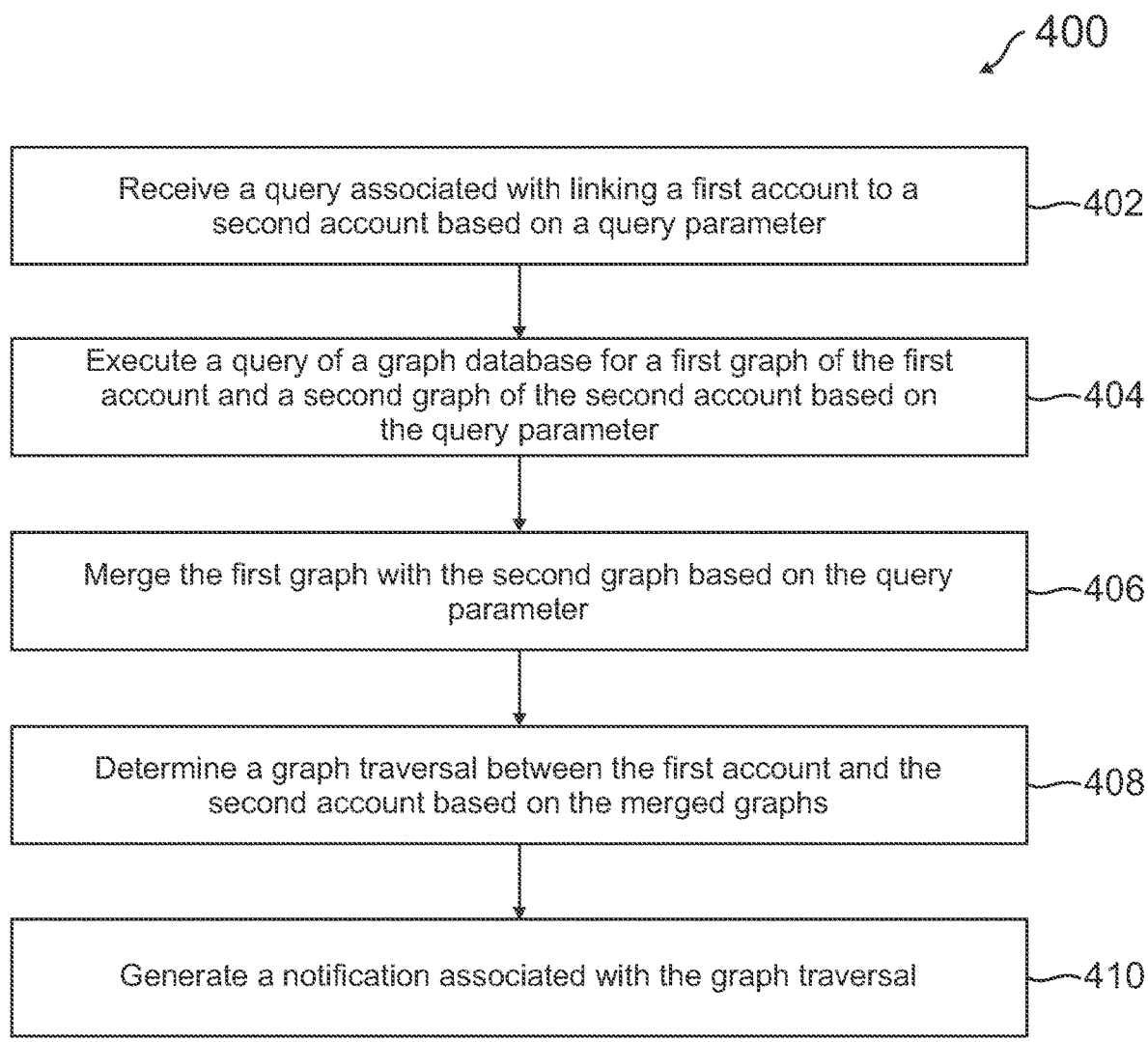
FIG. 4 is an exemplary flowchart for pairwise graph querying, merging, and computing for account linking, according to an embodiment.

FIG. 4 is an exemplary flowchart 400 for pairwise graph querying, merging, and computing for account linking, according to an embodiment. Note that one or more steps, processes, and methods of flowchart 400 described herein may be omitted, performed in a different sequence, or combined as desired or appropriate.

At step 402 of flowchart 400, a query that is associated with linking a first account to a second account is received based on a query parameter. The query may include identification of the first account and the second account, such as through account identifiers or other account data. Further, the query parameter may correspond to a request for a specific graph traversal, query, and/or exploration, such as one associated with risk compliance, risk or fraud conduct and/or potential, promotional services, or the like.

At step 404, a query of a graph database for a first graph of a first account and a second graph of the second account is executed based on the query parameter. A graph database may be queried using a graph query language or the like, which may return a data structure corresponding to a graph of the first and second accounts' connections, links, and/or relationships to other data. This may allow for identification and/or visualization of the first and second accounts' generation and/or interactions with different data. At step 406, the first graph is merged with the second graph based on the query parameter. This may include identifying the same or similar share data features, points, or the like between graphs, which allows for a unified graph to be generated that includes connections between each account. That unified graph may include connections between different data points that may be separated by a number of intermediary data points, links, or connections, such as a number of hops or shared characteristics that intercede between the two accounts.

At step 408, a graph traversal is determined between the first account and the second account based on the merged graph. The graph traversal may be performed based on the query for connections and/or pairwise similarities between the accounts. For example, the graph traversal may correspond to a request to identify risk, fraud, ATO or AML compliance, promotions, or the like that may be shared and/or facilitated based on the relationships between the accounts. The graph traversal may identify a number of "hop" or other connections between the accounts to identify shared data, interactions, accounts, or the like, which may facilitate whether there is pairwise similarity between those accounts. At step 410, a notification associated with the graph traversal is generated. The notification may correspond to an alert or the like of whether the accounts have been linked with pairwise similarity over a number of hops or links, or whether there are intermediary connections and/or data between such accounts.

Figure 5:
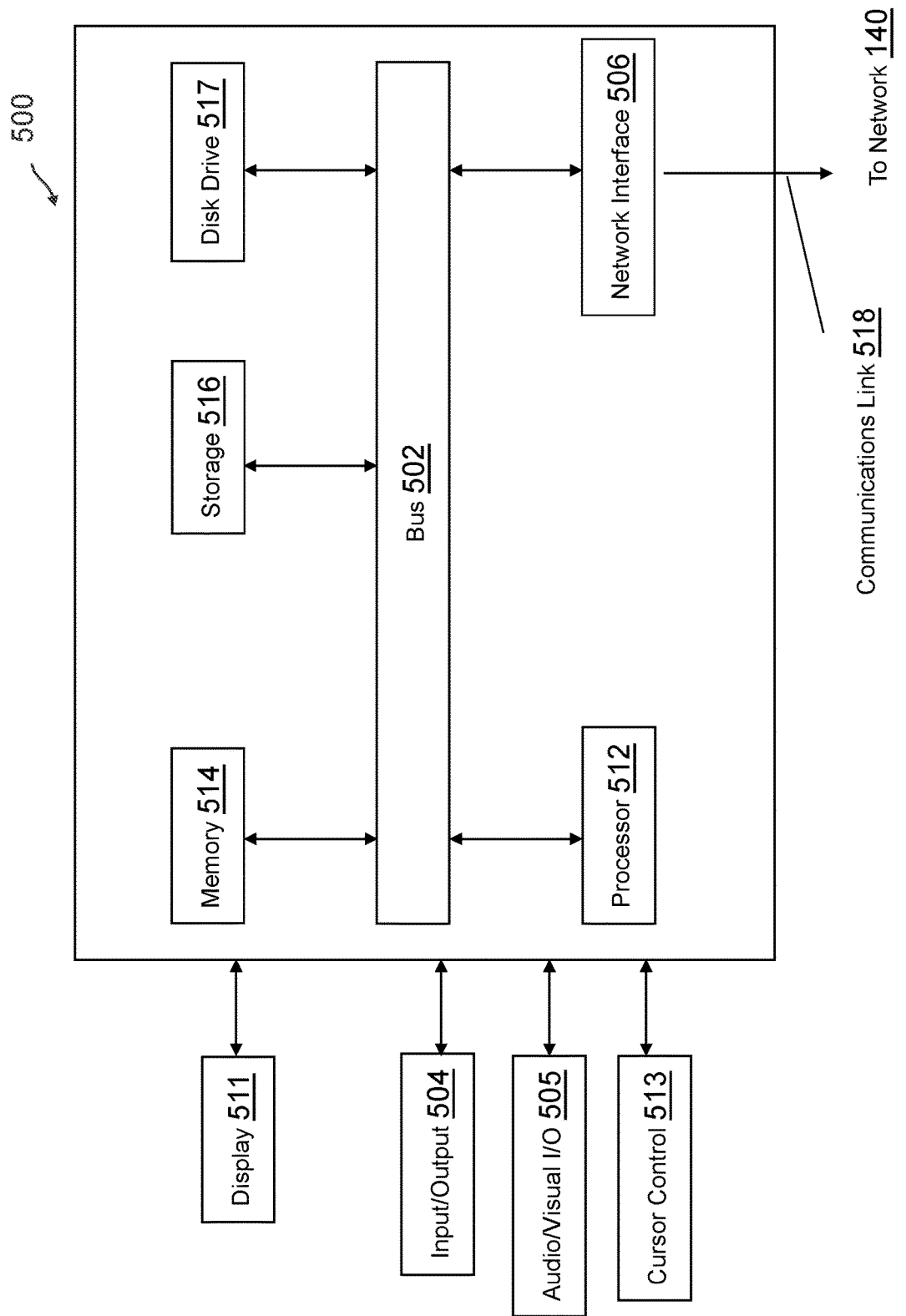
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
    a non-transitory memory; and
    one or more hardware processors coupled to the non-transitory memory and configured to read instructions from the non-transitory memory to cause the service provider system to perform operations comprising:
        receiving a request identifying a first account and a request parameter for the request that is associated with account activities by the first account;
        querying, based on the request, a graph database for a first graph having a plurality of graph paths to additional accounts based on the request parameter;
        generating the first graph based on the querying, wherein the first graph comprises the plurality of graph paths that associate the first account to the additional accounts based on the account activities;
        identifying, from the first graph, a second account through a first one of the plurality of graph paths;
        determining that the second account is linked to the first account through the first one of the plurality of graph paths;
        merging the first graph with a second graph associated with the second account; and
        determining a risk analysis of the first account using a risk analysis model based at least on additional graph paths of the merged first and second graphs.

2. The service provider system of claim 1, wherein the querying the graph database comprises:
    executing, based on the request parameter, two graph queries to the graph database using a graph query language for account associations of the first account and the second account,
    and wherein the generating the first graph comprises merging the account associations into the first graph.

3. The service provider system of claim 2, wherein the first graph further comprises one of a plurality of graphs between the first account and the second account based on a plurality of query parameters.

4. The service provider system of claim 2, wherein the operations further comprise:
    determining a second one of the plurality of graph paths linking the first account and the second account, wherein the second one of the plurality of graph paths is less than or equal to a number of steps of the account activities.

5. The service provider system of claim 1, wherein the request parameter comprises one of an account identifier, an IP address, payment card information, or an account transactional history, and wherein the request parameter further comprises vertices for the first graph connected by edges to other vertices based on past interactions associated with the request parameter.

6. The service provider system of claim 1, wherein the first graph comprises a real-time graph and the identifying is based on a pairwise similarity of shared vertices connected by edges that are less than or equal to a threshold number of vertices.

7. The service provider system of claim 1, wherein the operations further comprise:
    generating a notification of the second account linked to the first account based on the determining that the second account is linked to the first account.

8. The service provider system of claim 7, wherein the operations further comprise:
    determining a number of the plurality of graph paths between the first account and the second account is less than or equal to a threshold path length,
    wherein the notification is further based on the number of the plurality of graph paths.

9. The service provider system of claim 1, wherein the request is associated with one of an account promotional strategy, a risk review operation, a fraud detection operation, or an account compliance check.

10. A method comprising:
    receiving a request for a graph traversal of an account linkage graph from a first account to a plurality of other accounts, wherein the graph traversal comprises an account parameter for the account linkage graph that links the first account to the plurality of other accounts;
    determining, from a graph database, account asset links of the first account to other accounts based on the graph traversal;
    determining, from the graph traversal, a second account linked to the first account based on a threshold number of links between the first account and the second account;
    merging the account linkage graph with an additional graph associated with the second account;
    determining a risk analysis of the first account using a risk analysis model based at least on the merged account linkage graph; and
    outputting a notification of the second account linked to the first account based on the account parameter, the threshold number of links, and the risk analysis.

11. The method of claim 10, wherein the determining the account asset links comprises querying the graph database for a first graph associated with the account assets links of the first account.

12. The method of claim 11, further comprising:
performing the graph traversal of the graph for the second account linked to the first account based on the threshold number of links.

13. The method of claim 11, wherein the determining the account access links further comprises querying the graph database for the additional graph associated with the second account.

14. The method of claim 13, wherein the merging the account linkage graph with the additional graph is based on overlapping graph paths between the account linkage graph and the additional graph.

15. The method of claim 11, wherein the graph traversal between the first account and the second account is less than or equal to the threshold number of links.

16. A non-transitory machine-readable medium having stored thereon machine-readable instructions executable to cause a machine to perform operations comprising:
receiving a query for an identification of a link between a first account and a second account, wherein the query comprises a first parameter associated with the first account and the second account;
querying a graph database for a graph comprising the link between the first account and the second account, wherein the graph comprises a plurality of associations between the first account and the second account that include account data in common between the first account and the second account;
merging the graph with an additional graph associated with the second account;
determining, from the graph, a first association of the plurality of associations between the first account and the second account;
determining that the first association includes a number of steps of the account data in common between the first account and the second account that is less than or equal to a threshold;
determining a risk analysis of the first account using a risk analysis model based at least on the first association and the merged graph; and
flagging the first account based on the risk analysis.

17. The non-transitory machine-readable medium of claim 16, wherein the querying the graph database comprises:
requesting the graph from the graph database using a graph query language associated with the query and the first account; and
determining the graph comprises vertices and edges between the vertices for the plurality of associations.

18. The non-transitory machine-readable medium of claim 16, wherein the operations further comprise:
editing the graph based on one or more changes to the graph; and
persisting the one or more changes to the graph with the graph database.

19. The non-transitory machine-readable medium of claim 16, wherein the first parameter is one of at least two parameters for an account historical feature associated with the account.

20. The non-transitory machine-readable medium of claim 19, wherein the account historical feature is associated with a previous interaction by the account with at least one other account.

* * * * *